US011613473B2

(12) United States Patent
Harris et al.

(10) Patent No.: US 11,613,473 B2
(45) Date of Patent: Mar. 28, 2023

(54) ZIRCONIA-BASED COMPOSITIONS FOR USE AS THREE WAY CATALYSTS (71) Applicant: Magnesium Elektron Limited, Manchester (GB)

(72) Inventors: Deborah Jayne Harris, Manchester (GB); David Alastair Scapens, Manchester (GB)

(73) Assignee: Magnesium Elektron Limited, Manchester (GB)

( * ) Notice: Subject to any disclaimer, the term of this patent is extended or adjusted under 35 U.S.C. 154(b) by 354 days.

(21) Appl. No.: 15/770,065

(22) PCT Filed: Oct. 27, 2016

(86) PCT No.: PCT/GB2016/053335
§ 371 (c)(1),
(2) Date: Apr. 20, 2018

(87) PCT Pub. No.: WO2017/072509
PCT Pub. Date: May 4, 2017

(65) Prior Publication Data
US 2018/0304235 A1    Oct. 25, 2018

(30) Foreign Application Priority Data

Oct. 27, 2015 (GB) .................................... 1518996

(51) Int. Cl.
*B01J 37/03*     (2006.01)
*C01G 25/02*     (2006.01)
(Continued)

(52) U.S. Cl.
CPC .......... *C01G 25/02* (2013.01); *B01D 53/945* (2013.01); *B01J 13/0021* (2013.01);
(Continued)

(58) Field of Classification Search
CPC ... B01J 23/00; B01J 23/10; B01J 23/20; B01J 23/28; B01J 23/30; B01J 35/1014;
(Continued)

(56) References Cited

U.S. PATENT DOCUMENTS 6,171,572 B1    1/2001  Aozasa
7,642,210 B2 *  1/2010  Okamoto ............. B01D 53/885
                                                423/608

(Continued)

FOREIGN PATENT DOCUMENTS

CN    101623626 A    1/2010
CN    103191712 B    12/2014
(Continued)

OTHER PUBLICATIONS

International Search Report and Written Opinion for PCT/GB2016/053335 dated Dec. 16, 2016, 14 pages.
(Continued)

*Primary Examiner* — Smita S Patel
(74) *Attorney, Agent, or Firm* — Praedcere Law (57) ABSTRACT

A cerium-zirconium based mixed oxide composition have: (a) a Ce:Zr molar ratio of 1 or less, and (b) a cerium oxide content of 10-50% by weight. The composition has (i) a surface area of at least 18 $m^2/g$, and a total pore volume as measured by $N_2$ physisorption of at least 0.11 $cm^3/g$, after ageing at 1100° C. in an air atmosphere for 6 hours, (ii) a surface area of at least 42 $m^2/g$, and a total pore volume as measured by $N_2$ physisorption of at least 0.31 $cm^3/g$, after ageing at 1000° C. in an air atmosphere for 4 hours, and (iii) Dynamic Oxygen Storage Capacity (D-OSC) value as measured by $H_2$-TIR of greater than 500 μmol/g at 600° C. after aging at 800° C. in an air atmosphere for 2 hours. A process contacts the exhaust gas with the composition Another process is for preparing the composition.

27 Claims, 5 Drawing Sheets

(51) Int. Cl.

| | |
|---|---|
| B01J 21/06 | (2006.01) |
| B01J 37/04 | (2006.01) |
| B01J 35/10 | (2006.01) |
| B01J 37/08 | (2006.01) |
| B01J 37/06 | (2006.01) |
| C01F 17/32 | (2020.01) |
| B01J 23/10 | (2006.01) |
| B01D 53/94 | (2006.01) |
| B01J 37/10 | (2006.01) |
| C01G 25/00 | (2006.01) |
| B01J 13/00 | (2006.01) |
| B01J 35/00 | (2006.01) |
| B01J 35/02 | (2006.01) |
| B01J 23/20 | (2006.01) |
| B01J 23/28 | (2006.01) |
| B01J 23/30 | (2006.01) |

(52) U.S. Cl.

CPC ......... *B01J 13/0047* (2013.01); *B01J 21/066* (2013.01); *B01J 23/10* (2013.01); *B01J 35/002* (2013.01); *B01J 35/023* (2013.01); *B01J 35/1014* (2013.01); *B01J 35/1038* (2013.01); *B01J 35/1042* (2013.01); *B01J 35/1061* (2013.01); *B01J 35/1066* (2013.01); *B01J 37/03* (2013.01); *B01J 37/031* (2013.01); *B01J 37/036* (2013.01); *B01J 37/04* (2013.01); *B01J 37/06* (2013.01); *B01J 37/08* (2013.01); *B01J 37/10* (2013.01); *C01F 17/32* (2020.01); *C01G 25/006* (2013.01); *B01D 2255/407* (2013.01); *B01J 23/20* (2013.01); *B01J 23/28* (2013.01); *B01J 23/30* (2013.01); *B01J 2523/00* (2013.01); *C01P 2002/52* (2013.01); *C01P 2002/60* (2013.01); *C01P 2002/72* (2013.01); *C01P 2002/88* (2013.01); *C01P 2006/12* (2013.01); *C01P 2006/13* (2013.01); *C01P 2006/14* (2013.01); *C01P 2006/16* (2013.01); *C01P 2006/17* (2013.01)

(58) Field of Classification Search

CPC .. B01J 35/1038; B01J 35/1042; B01J 35/023; B01J 35/002; B01J 35/1061; B01J 2523/3712; B01J 2523/3725; B01J 2523/48; B01J 2523/36; B01J 2523/3718; B01J 2523/00; B01J 2523/3706; B01J 36/1066; B01J 13/0021; B01J 13/0047; B01J 37/04; B01J 37/03; B01J 37/10; B01J 37/036; B01J 37/06; B01J 37/031; B01J 37/08; B01J 21/066; B01D 2255/407; B01D 53/945; C01P 2006/17; C01P 2006/12; C01P 2006/13; C01P 2006/14; C01P 2002/88; C01P 2002/78; C01P 2002/60; C01P 2002/52; C01P 2002/72; C01G 25/02; C01G 25/006

See application file for complete search history.

(56) References Cited

U.S. PATENT DOCUMENTS

| | | | |
|---|---|---|---|
| 7,939,462 B2 | 5/2011 | Larcher et al. | |
| 10,010,868 B2* | 7/2018 | Shingai | ................. C01G 25/00 |
| 2013/0142713 A1* | 6/2013 | Ifrah | ..................... B01J 37/031 |
| | | | 423/213.2 |
| 2016/0207027 A1* | 7/2016 | Kodama | ................. B01J 23/10 |

FOREIGN PATENT DOCUMENTS

| | | |
|---|---|---|
| EP | 0409282 A2 | 1/1991 |
| EP | 0955267 A1 | 11/1999 |
| EP | 3085667 A1 | 10/2016 |
| EP | 3188829 A1 | 7/2017 |
| EP | 3368481 B1 | 7/2021 |
| WO | WO9845212 A1 | 10/1998 |
| WO | WO03037506 A1 | 5/2003 |
| WO | WO2011138255 A1 | 11/2011 |
| WO | WO2012088373 A2 | 6/2012 |
| WO | WO2014122140 A2 | 8/2014 |
| WO | WO-2014196100 A1 * | 12/2014 ............. B01J 23/10 |
| WO | WO2015145787 A1 | 10/2015 |
| WO | WO-2015145787 A1 * | 10/2015 .......... B01J 35/1066 |
| WO | WO2016037059 A1 | 3/2016 |
| WO | PCT/GB2016053335 A | 11/2016 |
| WO | WO2017185224 A1 | 11/2017 |

OTHER PUBLICATIONS

Search and Examination Report for GB1518996.2 dated Mar. 7, 2016, 6 pages.
Third party Observation dated Aug. 10, 2020 for application No. EP20160788758, 3 pages.
Third party Observation dated Jul. 14, 2020 for application No. EP20160788758, 4 pages.
Third party Observation dated Jul. 7, 2020 for European patent No. EP3368481, 3 pages.
Notice of Opposition for European patent application No. 16788758.7/patent No. EP3368481, dated Apr. 19, 2022.
Wikipedia—Specific Surface Area; http://cms.wsl.ch/fe/schnee/projekte/SSA/index_EN.
Occelli et al., "Surface Area, Pore Volume Distribution, and Acidity in Mesoporous Expanded Clay Catalysts from Hybrid Density Functional Theory (DFT) and Adsorption Microcalorimetry Methods,", Langmuir 2022, vol. 18, pp. 9816-9823.
Joyner et al., "The Determination of Pore Volume and Area Distribution in Porous Substances. Comparison between Nitrogen Isotherm and Mercury Porosimeter Methods," Pore Volume and Area Distribution in Porous Substances, Multiple Fellowship of Baugh and Sons Company, Jul. 1951, vol. 73, pp. 3155-3158.
Adkins et al., "Comparison of Nitrogen Adsorption and Mercury Penetration Results I. Pore Volume and Surface Area Obtained for Type IV Isotherms," Aug. 5, 1987, pp. 76-93.
Pudukudy et al., "Catalytic Aspects of Ceria-Zirconia Solid Solution: Part-I An update in the synthesis, properties and chemical reactions of ceria zirconia solid solution," Der Pharma Chemica, 2014, 6(1), pp. 188-216.
Priority application GB1518996.2, published May 4, 2017 as part of PCT/GB2016/053335.

\* cited by examiner

ZIRCONIA-BASED COMPOSITIONS FOR USE AS THREE WAY CATALYSTS

This invention relates to processes for preparing cerium-zirconium based mixed hydroxides and mixed oxides, compositions comprising zirconium hydroxide/oxide and cerium hydroxide/oxide, as well as the use of the mixed oxide in catalysis such as for treating vehicle exhaust gases.

BACKGROUND

It is well-known to fit catalytic converters to exhaust systems of vehicles. A catalytic converter is an emissions control device that converts toxic pollutants in exhaust gas to less toxic pollutants by catalysing a redox reaction (oxidation or reduction).

One known type of catalytic converters are three-way catalytic converters (TWCs). A three-way catalytic converter has three simultaneous tasks:
 (i) Reduction of nitrogen oxides to nitrogen and oxygen: $2NO_x \rightarrow xO_2 + N_2$
 (ii) Oxidation of carbon monoxide to carbon dioxide: $2CO + O_2 \rightarrow 2CO_2$
 (iii) Oxidation of unburnt hydrocarbons (HC) to carbon dioxide and water: $C_xH_{2x+2} + [(3x+1)/2]O_2 \rightarrow xCO_2 + (x+1)H_2O$.

Compositions comprising zirconium oxide and cerium oxide (also referred to as cerium-zirconium based mixed oxides) are known for use in TWCs. Such TWC materials need to have a minimum level of thermal stability, in addition to good redox properties, in order to meet legislative requirements in various countries.

Thermal stability is normally tested by known analytical tests which demonstrate the existence and retention of a desired porous structure upon thermal aging. This aspect is important in the area of TWCs as the retention of good dispersion of PGM on aging is essential for the durability and activity requirements of a TWC material in an exhaust stream, especially when accelerated aging in hydrothermal conditions are used.

A further desirable property of compositions for use in TWCs is that they have good oxygen diffusion kinetics. A primary role of the composition for use in TWCs is to act as an oxygen storage and release material throughout the lean-rich cycling in a gasoline powered internal combustion engine. For a composition comprising zirconium oxide and cerium oxide, this is by virtue of the variable oxidation state of the cerium cations in the zirconia lattice. As emissions legislations become more stringent, catalysts that work more efficiently as well as under more brutal thermal conditions are desired. A large majority of emissions are released prior to the light off of the catalyst, so a catalyst that can operate at lower temperatures is interesting in the field.

There is also a need for the catalysts to be efficient in more dynamic situations. Real World Driving Cycles and on-board Emissions Monitoring are driving the need for catalysts to work at lower temperature and in more dynamic cycles than previous testing protocols. In parallel, engine development is also demanding different behavior from catalysts so that they function efficiently in terms of fluctuations in temperature, engine out emission levels and/or lambda value (i.e., air:fuel ratio).

Compositions for use as TWCs, comprising zirconium oxide and cerium oxide, having improved thermal stability and superior oxygen diffusion characteristics have therefore been sought. Supplementary to the superior oxygen diffusion characteristics, improved interaction of the oxygen storage function and the PGM could result in maintaining a more effective dispersion of the active metal after aging. This enhanced PGM coupling allows the potential of efficient operation over a wider range of dynamic conditions.

The evaluation of the redox properties of these materials commonly utilises a Temperature Programmed Reduction technique. This is a measure of hydrogen consumption of a cerium zirconium compound as a function of the temperature and a total value of hydrogen consumed can be related to the Total Oxygen Storage Capacity (OSC). A high Total Oxygen Storage Capacity is desired in the use of the materials in TWC materials.

Although hydrogen is commonly used as the probe molecule, other gases or other gas mixtures can be used to investigate the Oxygen Storage behaviour of cerium and zirconium based mixed oxides. Hydrogen TPR has the advantage of being quick, cheap and widely available without large capital investment.

Although the total amount of oxygen capable of being stored (and released) is important, the kinetics of the storage and release of oxygen through the lean-rich cycles is arguably more important. The dynamic switching of the exhaust stream over the catalyst means that it is unlikely that an equilibrium is reached. At low temperatures, it would be desirable to have a larger proportion of the total Oxygen Storage Capacity available for reaction with the exhaust gases. The commonly used Temperature Programmed Reduction technique has limited ability to provide kinetic data. Instead, a laboratory protocol can be used whereby a high concentration of a reducing gas is pulsed over the oxidised solid. At low temperatures and high concentration of reductant, the ability to react a greater amount of the reductant in the first pulse gives an indication of the materials 'dynamic' activity.

Alternatively, one can use a reduced sample and pulse a high concentration of oxidising gas over it at low temperatures to also demonstrate the relative activity of the solid in a catalytic system.

Materials under test can either be as prepared, subjected to a thermal treatment or a hydrothermal treatment, and with or without a PGM (a Platinum Group Metal, i.e., palladium, platinum, rhodium, ruthenium, iridium and/or osmium). It is useful to know the ability of the solid to retain the OSC function after an appropriate aging condition with PGM dispersed on the material. This will be most like the conditions in practical use. Retention of the OSC function available for catalysis after aging being desirable. For example, a test method such as an $H_2$ pulsing technique may be used. This involves taking 100 mg of a powdered sample (typically 1% Pd-loaded, but no PGM or other PGM's and loadings could be chosen). This is pre-oxidised initially by pulsing 20% $O_2$/He at 100° C. followed by flowing 20% $O_2$/He at 500° C. for 30 minutes. The temperature is then lowered to the desired experimental conditions (e.g., 70° C. in our case) under flowing Ar. A series of 521 microlitre pulses (15 in total) of 70% $H_2$/Ar are passed over the sample, and their reaction monitored by TCD. The sample becomes 'saturated' and the amount of reaction in the first pulse is compared against this saturation limit to give a first pulse/'dynamic' OSC value. A low temperature and high $H_2$ concentration are used to stress the system. There is a similar testing method utilising $O_2$ pulses. This involves taking 100 mg of a powdered sample (typically no PGM, but PGM's at various loadings could be used). This is pre-reduced in flowing 5% $H_2$/Ar at 850° C. for 30 minutes. The temperature is then lowered to the desired experimental conditions (e.g., 50° C. in our case) under flowing Ar. A series of 521 microlitre pulses (14 in total) of 20% $O_2$/He are passed over the sample, and their reaction monitored by Thermal Conductivity Detector (TCD). The sample becomes 'saturated' and the amount of reaction in the first pulse is compared against this saturation limit to give a first pulse/'dynamic' OSC value. When no PGM is loaded on the mixed metal oxide, the total OSC is calculated by summing the results of each pulse up to the point of saturation. A low temperature and high $O_2$ concentration are used to stress the system.

In parallel with the evaluation protocols above, there are more advanced techniques whereby the rate of oxygen exchange can be estimated/determined. For example, Temperature Isothermal Reduction techniques and Temperature Isothermal Isotopic Exchange (TIIE).

Temperature Isothermal Reduction techniques involve determination of the kinetics of reduction of a given solid metal oxide by a probe gas under isothermal conditions. This is a dynamic technique, similar to the TPR technique except the reduction kinetics are a function of time at constant temperature. At any given temperature, the kinetics of reduction of a solid is characterised by a line profile rather than by a single point in the TPR technique. It is therefore suggested that this technique is more advantageous for comparing the reduction kinetics of metal or mixed metal oxides.

WO2014/122140 and U.S. Pat. No. 6,171,572 describe cerium-zirconium based mixed oxides and methods for preparing such materials. However, the compositions disclosed do not have the pore volume properties after aging which are achieved with the present invention.

STATEMENT OF INVENTION

According to one aspect of the invention, there is provided a process for preparing a cerium-zirconium based mixed hydroxide or mixed oxide, the process comprising the steps of:
(a) dissolving a zirconium salt in an aqueous acid,
(b) adding one or more complexing agents to the resulting solution, the one or more complexing agents being an organic compound comprising at least one of the following functional groups: an amine, an organosulphate, a sulphonate, a hydroxyl, an ether or a carboxylic acid group,
(c) heating the solution or sol formed in step (b),
(d) adding a cerium salt, and adding a sulphating agent either before or after the addition of the cerium salt, and
(e) adding a base to form a cerium-zirconium based mixed hydroxide.

When cerium-zirconium based mixed hydroxides and oxides produced by this process are aged, especially using hydrothermal aging conditions at high temperatures, the pore volume in the mesoporous region can be advantageously retained. This can provide two benefits: (i) to retain a pore size that minimises any gas diffusion limitations in the resulting solid; and (ii) to retain sufficient volume of pores of an appropriate size such that reduction of catalytic activity by loss of PGM dispersion is minimised.

In some embodiments, the zirconium salt may be zirconium basic carbonate or zirconium hydroxide. In certain embodiments, zirconium basic carbonate (ZBC) is preferred because it dissolves easily in mineral acids, is commercially available, and the carbonate anions produced are fugitive and so they don't take part of complicate subsequent reactions. Some alternative anions may not be environmentally favourable. In some embodiments, the aqueous acid may be hydrochloric acid, sulphuric acid, nitric acid or acetic acid, in particular the aqueous acid is nitric acid. Without wishing to be bound to any theory, although other acids may be used it is thought that the nitrate ions provided by nitric acid coordinate particularly well with the zirconium ions in the aqueous solution.

In particular, in step (a) the molar ratio of zirconium ions to nitrate ions in the solution or sol may be 1:0.8 to 1:1.5, more particularly 1:1.0 to 1:1.3.

In the context of the invention, the term complexing agent is used to mean a ligand that bonds to zirconium. In some embodiments, in step (b) the complexing agent may be a carboxylic acid, a dicarboxylic acid, an alpha hydroxycarboxylic acid, an amino acid, an organosulphate or a polyol. In particular, the complexing agent may be a multidentate, more particularly a bidentate, ligand. The polyol may be a polysaccharide, for example starch. In particular, the complexing agent may be an alpha hydroxycarboxylic acid. The complexing agent generally has a polar group (ie an amine, an organosulphate, a sulphonate, a hydroxyl, an ether or a carboxylic acid group) which coordinates to zirconium, and one or more hydrocarbon groups. In some embodiments, the one or more hydrocarbon groups may comprise one or more aromatic substituents, more particularly one or more phenyl substituents. Without wishing to be bound to any theory, multidentate ligands coordinate effectively to metal ions. The combination of different functional groups within the same molecule may be advantageous to interact with different coordination environments on the metal ion; providing both steric and electronic effects. Thus, depending upon the nature of the pore size and pore network, complexing agents with different hydrocarbon groups may be used. For example, the alpha hydroxy carboxylic acid may be an aromatic (for example, phenyl) or non-aromatic alpha hydroxycarboxylic acid, more particularly mandelic or benzillic or lactic acid.

In particular, in step (a) the solution formed may be heated. In particular, the solution may be heated to a temperature above 25° C., more particularly to at least 40° C., even more particularly at least 50° C., more particularly to a temperature in the range 50-70° C. More particularly, the solution may be heated to around 60° C.

Optionally, in step (a) the pH of the solution may be increased (i.e., partially neutralised) by adding a base. This increase in pH can also be described as a reduction in free acidity. In particular, the pH increase may be carried out prior to heating the solution. More particularly, the base may be sodium hydroxide, sodium carbonate, sodium hydrogen carbonate, ammonium hydroxide, ammonium carbonate, ammonium hydrogen carbonate, potassium hydroxide, potassium carbonate, and/or potassium hydrogen carbonate.

In particular, step (b) may additionally comprise adding water, normally deionised water, to the heated solution. More particularly, in step (b), after the addition of the complexing agent, and optional water, the solution has an equivalent zirconium content of 5-25% by weight expressed as $ZrO_2$, more particularly 10-20% by weight, even more particularly 12-16% by weight, expressed as $ZrO_2$. The equivalent zirconium content expressed as $ZrO_2$ means that, for example, 100 g of a 15% by weight solution would have the same zirconium content as 15 g of $ZrO_2$.

More particularly, in step (c) the heating may comprise heating the solution or sol to a temperature of 60-100° C., more particularly 80-100° C., for 1-15 hours. In particular, the heating may be carried out for 1-5 hours. More particularly, in step (c) the temperature of the solution or sol may be increased at a rate of 0.1-1.5° C./min.

In particular, in step (d) the solution or sol may be allowed to cool, or cooled, before adding the sulphating agent. More particularly, the solution or sol may be allowed to cool, or cooled, to a temperature less than 40° C., even more particularly less than 30° C. Possible sulphating agents are water soluble salts of sulphate, bisulphate, sulphite, bisulphite. In particular, the sulphating agent may be sulphuric acid. The sulphating agent may be added such that the molar ratio of zirconium ions to sulphate ions is from 1:0.05 to 1:1. After the sulphate addition in step (d), the process may comprise the step of isolating the solid from the solution or sol, for example by filtering.

More particularly, step (d) may additionally comprise adding an aqueous electrolyte before the addition of the sulphating agent. The aqueous electrolyte may be added before the addition of the cerium salt. In particularly, the aqueous electrolyte may be fully or partially neutralised hydrochloric acid, fully or partially neutralised nitric acid or fully or partially neutralised acetic acid. Partially neutralised nitric acid is also referred to as acidified sodium nitrate.

More particularly, the cerium salt may be cerium carbonate, cerium chloride, cerium nitrate (for example, cerous nitrate, ceric nitrate or a mixture thereof) or ammonium cerium nitrate. In particular, step (d) may additionally comprise adding one or more salts of: silica, aluminium, strontium, a transition metal (more particularly tin, niobium, tungsten, manganese and/or iron), or a rare earth element (more particularly scandium lanthanum, neodymium, praseodymium, yttrium, gadolinium and/or samarium). In the context of the invention, yttrium is considered to be a rare earth element.

In step (e), the base may be sodium hydroxide, sodium carbonate, sodium hydrogen carbonate, ammonium hydroxide, ammonium carbonate, ammonium hydrogen carbonate, potassium hydroxide, potassium carbonate and/or potassium hydrogen carbonate. More particularly, in step (e) the addition of the base is to form a cerium-zirconium based mixed hydroxide precipitate. Step (e) may be carried out at any temperature at which the solution or sol is not frozen, i.e., from −5° C. to 95° C., more particularly, 10° C. to 80° C.

In some embodiments, the process may comprise after step (e) the step of (f) heat treating the cerium-zirconium based mixed hydroxide. The heat treatment may be hydrothermal treatment. The hydrothermal treatment may comprise heating the solution or sol to a temperature of 80-250° C., more particularly 100-250° C., for 1-15 hours in an autoclave.

More particularly, between steps (e) and (f) the process may comprise the steps of isolating, for example by filtering, and/or washing the cerium-zirconium based mixed hydroxide. These steps may be carried out to remove chloride ions, sulphate ions, nitrate ions, acetate ions, sodium ions, potassium ions, ammonium ions and/or organic residue if desired. Levels of sulphate ions may be reduced to 0.3% by weight or less, more particularly 0.1% by weight or less. Levels of sodium, potassium and chloride ions may be reduced to 0.05% by weight or less each, more particularly 0.01% by weight or less each.

In some embodiments, the process may comprise after step (f), or after step (e) if step (f) is not carried out, the step of (g) drying the cerium-zirconium mixed hydroxide. In particular, this may be by oven-drying, spray-drying or vacuum-drying. Drying may be carried out in an oxidising, inert (e.g., $N_2$) or reducing atmosphere. More particularly, the cerium-zirconium based mixed hydroxide may be dried at a temperature of 50-200° C. If a vacuum is used, the drying temperature can be at the lower end of this range. Without a vacuum, temperatures at the higher end of this range may be required, for example 100-150° C.

In some embodiments, the process may comprise after step (g), or after step (e) or (f) if step (f) and/or (g) is not carried out, the step of (h) calcining the cerium-zirconium mixed hydroxide to form a cerium-zirconium based mixed oxide. More particularly, the calcining step may be carried out at temperature of 500-1300° C., even more particularly 700-1100° C. The calcining step may be carried out for 1-10 hours, more particularly 2-8 hours. The calcining step may be carried out in any gaseous atmosphere. In particular, the calcining step may be carried out in a static or flowing air atmosphere, although a reductive or neutral atmosphere could be used. In the process of the invention, an air atmosphere is generally preferred since this can assist in removing organic species. A neutral atmosphere is generally defined as one which neither oxidises nor reduces the composition in that atmosphere. This can be done by removing air or removing oxygen from the atmosphere. A further example of a neutral atmosphere is a nitrogen atmosphere. Furthermore, the calcination atmosphere could be that of the combustion gases generated from a gas-fired kiln.

The invention also relates to compositions obtainable by the above process.

According to a further aspect of the invention, there is provided a composition comprising zirconium oxide and cerium oxide having:
 (a) a Ce:Zr molar ratio of 1 or less, and
 (b) a cerium oxide content of at least 5% by weight,
wherein the composition has a surface area of at least 48 $m^2/g$ after aging at 950° C. in an air atmosphere for 2 hours.

In some embodiments, the composition has a surface area of at least 60 $m^2/g$ after aging at 950° C. in an air atmosphere for 2 hours, optionally at least 70 $m^2/g$. In some embodiments, the composition has a surface area of less than 120 $m^2/g$ after aging at 950° C. in an air atmosphere for 2 hours.

According to a third aspect of the invention, and/or in combination with the compositional features defined above, there is provided a composition comprising zirconium oxide and cerium oxide having:
 (a) a Ce:Zr molar ratio of 1 or less, and
 (b) a cerium oxide content of at least 5% by weight,
wherein the composition has a total pore volume as measured by $N_2$ physisorption of at least 0.29 $cm^3/g$ after aging at 950° C. in an air atmosphere for 2 hours.

In some embodiments, the composition has a total pore volume as measured by $N_2$ physisorption of at least 0.37 $cm^3/g$ after aging at 950° C. in an air atmosphere for 2 hours, optionally at least 0.41 $cm^3/g$. In some embodiments, the composition has a total pore volume as measured by $N_2$ physisorption of less than 1.0 $cm^3/g$ after aging at 950° C. in an air atmosphere for 2 hours.

According to a fourth aspect of the invention, and/or in combination with the compositional features defined above, there is provided a composition comprising zirconium oxide and cerium oxide having:
 (a) a Ce:Zr molar ratio of 1 or less, and
 (b) a cerium oxide content of at least 5% by weight,
wherein the composition has a crystallite size as measured by applying the Scherrer equation to the relevant peak in its XRD scan of no greater than 12 nm after aging at 950° C. in an air atmosphere for 2 hours.

For all crystallite size measurements discussed herein. The "relevant peak" is the diffraction peak for zirconia in either a metastable tetragonal system or in a cubic system in the X-ray diffraction (XRD) scan.

It is preferred that the composition has a crystallite size as measured by applying the Scherrer equation to the relevant peak in its XRD scan of no greater than 10 nm after aging at 950° C. in an air atmosphere for 2 hours, more preferably no greater than 9.5 nm.

According to a fifth aspect of the invention, and/or in combination with the compositional features defined above, there is provided a composition comprising zirconium oxide and cerium oxide having:
  (a) a Ce:Zr molar ratio of 1 or less, and
  (b) a cerium oxide content of at least 5% by weight,
wherein the composition has a surface area of at least 42 m$^2$/g after aging at 1000° C. in an air atmosphere for 4 hours.

In some embodiments, the composition has a surface area of at least 50 m$^2$/g after aging at 1000° C. in an air atmosphere for 4 hours, optionally at least 60 m$^2$/g. In some embodiments, the composition has a surface area of less than 120 m$^2$/g after aging at 1000° C. in an air atmosphere for 4 hours.

According to a sixth aspect of the invention, and/or in combination with the compositional features defined above, there is provided a composition comprising zirconium oxide and cerium oxide having:
  (a) a Ce:Zr molar ratio of 1 or less, and
  (b) a cerium oxide content of at least 5% by weight,
wherein the composition has a total pore volume as measured by N$_2$ physisorption of at least 0.31 cm$^3$/g after aging at 1000° C. in an air atmosphere for 4 hours.

In some embodiments, the composition has a total pore volume as measured by N$_2$ physisorption of at least 0.35 cm$^3$/g after aging at 1000° C. in an air atmosphere for 4 hours, optionally at least 0.40 cm$^3$/g, and in some embodiments at least 0.45 cm$^3$/g. In some embodiments, the composition has a total pore volume as measured by N$_2$ physisorption of less than 1.0 cm$^3$/g after aging at 1000° C. in an air atmosphere for 4 hours.

According to a seventh aspect of the invention, and/or in combination with the compositional features defined above, there is provided a composition comprising zirconium oxide and cerium oxide having:
  (a) a Ce:Zr molar ratio of 1 or less, and
  (b) a cerium oxide content of at least 5% by weight,
wherein the composition has a crystallite size as measured by applying the Scherrer equation to the relevant peak in its XRD scan of no greater than 14 nm after aging at 1000° C. in an air atmosphere for 4 hours.

It is preferred that the composition has a crystallite size as measured by applying the Scherrer equation to the relevant peak in its XRD scan of no greater than 11 nm after aging at 1000° C. in an air atmosphere for 4 hours, in some embodiments no greater than 10 nm.

According to an eighth aspect of the invention, and/or in combination with the compositional features defined above, there is provided a composition comprising zirconium oxide and cerium oxide having:
  (a) a Ce:Zr molar ratio of 1 or less, and
  (b) a cerium oxide content of at least 5% by weight,
wherein the composition has a surface area of at least 33 m$^2$/g after aging at 1050° C. in an air atmosphere for 2 hours. In some embodiments, the composition has a surface area of less than 120 m$^2$/g after aging at 1050° C. in an air atmosphere for 2 hours.

In some embodiments, the composition has a surface area of at least 38 m$^2$/g after aging at 1050° C. in an air atmosphere for 2 hours, optionally at least 40 m$^2$/g.

According to a ninth aspect of the invention, and/or in combination with the compositional features defined above, there is provided a composition comprising zirconium oxide and cerium oxide having:
  (a) a Ce:Zr molar ratio of 1 or less, and
  (b) a cerium oxide content of at least 5% by weight,
wherein the composition has a total pore volume as measured by N$_2$ physisorption of at least 0.20 cm$^3$/g after aging at 1050° C. in an air atmosphere for 2 hours. In some embodiments, the composition has a total pore volume as measured by N$_2$ physisorption of less than 1.0 cm$^3$/g after aging at 1050° C. in an air atmosphere for 2 hours.

In some embodiments, the composition has a total pore volume as measured by N$_2$ physisorption of at least 0.25 cm$^3$/g after aging at 1050° C. in an air atmosphere for 2 hours, optionally at least 0.28 cm$^3$/g.

According to a tenth aspect of the invention, and/or in combination with the compositional features defined above, there is provided a composition comprising zirconium oxide and cerium oxide having:
  (a) a Ce:Zr molar ratio of 1 or less, and
  (b) a cerium oxide content of at least 5% by weight,
wherein the composition has a crystallite size as measured by applying the Scherrer equation to the relevant peak in its XRD scan of no greater than 15 nm after aging at 1050° C. in an air atmosphere for 2 hours.

It is preferred that the composition has a crystallite size as measured by applying the Scherrer equation to the relevant peak in its XRD scan of no greater than 13 nm after aging at 1050° C. in an air atmosphere for 2 hours, in some embodiments no greater than 12 nm.

According to an eleventh aspect of the invention, and/or in combination with the compositional features defined above, there is provided a composition comprising zirconium oxide and cerium oxide having:
  (a) a Ce:Zr molar ratio of 1 or less, and
  (b) a cerium oxide content of at least 5% by weight,
wherein the composition has a surface area of at least 18 m$^2$/g after aging at 1100° C. in an air atmosphere for 6 hours. In some embodiments, the composition has a surface area of less than 120 m$^2$/g after aging at 1100° C. in an air atmosphere for 6 hours.

It is preferred that the composition has a surface area of at least 20 m$^2$/g after aging at 1100° C. in an air atmosphere for 6 hours, in some embodiments at least 23 m$^2$/g, optionally at least 25 m$^2$/g.

According to a twelfth aspect of the invention, and/or in combination with the compositional features defined above, there is provided a composition comprising zirconium oxide and cerium oxide having:
  (a) a Ce:Zr molar ratio of 1 or less, and
  (b) a cerium oxide content of at least 5% by weight,
wherein the composition has a total pore volume as measured by N$_2$ physisorption of at least 0.11 cm$^3$/g after aging at 1100° C. in an air atmosphere for 6 hours. In some embodiments, the composition has a total pore volume as measured by N$_2$ physisorption of less than 1.0 cm$^3$/g after aging at 1100° C. in an air atmosphere for 6 hours.

In some embodiments, the composition has a total pore volume as measured by N$_2$ physisorption of at least 0.14 cm$^3$/g after aging at 1100° C. in an air atmosphere for 6 hours, optionally at least 0.17 cm$^3$/g.

According to a thirteenth aspect of the invention, and/or in combination with the compositional features defined above, there is provided a composition comprising zirconium oxide and cerium oxide having:
  (a) a Ce:Zr molar ratio of 1 or less, and
  (b) a cerium oxide content of at least 5% by weight, wherein the composition has a crystallite size as measured by applying the Scherrer equation to the relevant peak in its XRD scan of no greater than 26 nm after aging at 1100° C. in an air atmosphere for 6 hours.

In some embodiments, the composition has a crystallite size as measured by applying the Scherrer equation to the relevant peak in its XRD scan of no greater than 20 nm after aging at 1100° C. in an air atmosphere for 6 hours, optionally no greater than 18 nm.

According to a fourteenth aspect of the invention, and/or in combination with the compositional features defined above, there is provided a composition comprising zirconium oxide and cerium oxide having:

(a) a Ce:Zr molar ratio of 1 or less, and
(b) a cerium oxide content of at least 5% by weight, wherein the composition has a surface area of at least 18 m$^2$/g after hydrothermal aging at 1100° C. for 12 hours in an air atmosphere comprising 10% by volume of water.

In some embodiments, the composition has a surface area of at least 19 m$^2$/g after hydrothermal aging at 1100° C. for 12 hours in an air atmosphere comprising 10% by weight of volume, optionally at least 20 m$^2$/g.

According to a fifteenth aspect of the invention, and/or in combination with the compositional features defined above, there is provided a composition comprising zirconium oxide and cerium oxide having:

(a) a Ce:Zr molar ratio of 1 or less, and
(b) a cerium oxide content of at least 5% by weight, wherein the composition has a total pore volume as measured by N$_2$ physisorption of at least 0.11 cm$^3$/g after hydrothermal aging at 1100° C. for 12 hours in an air atmosphere comprising 10% by volume of water. In some embodiments, the composition has total pore volume as measured by N$_2$ physisorption of less than 1.0 cm$^3$/g after aging at 1100° C. for 12 hours in an air atmosphere comprising 10% by volume of water.

In some embodiments, the composition has a total pore volume as measured by N$_2$ physisorption of at least 0.13 cm$^3$/g after hydrothermal aging at 1100° C. for 12 hours in an air atmosphere comprising 10% by volume of water, optionally at least 0.15 cm$^3$/g.

According to a sixteenth aspect of the invention, and/or in combination with the compositional features defined above, there is provided a composition comprising zirconium oxide and cerium oxide having:

(a) a Ce:Zr molar ratio of 1 or less, and
(b) a cerium oxide content of at least 5% by weight, wherein the composition has a crystallite size as measured by applying the Scherrer equation to the relevant peak in its XRD scan of no greater than 25 nm after hydrothermal aging at 1100° C. for 12 hours in an air atmosphere comprising 10% by volume of water.

In some embodiments, the composition has a crystallite size as measured by applying the Scherrer equation to the relevant peak in its XRD scan of no greater than 22 nm after hydrothermal aging at 1100° C. for 12 hours in an air atmosphere comprising 10% by volume of water, more preferably no greater than 19 nm.

According to a seventeenth aspect of the invention, and/or in combination with the compositional features defined above, there is provided a composition comprising zirconium oxide and cerium oxide having:

(a) a Ce:Zr molar ratio of 1 or less, and
(b) a cerium oxide content of at least 5% by weight, wherein the composition has a Dynamic-Oxygen Storage Capacity (D-OSC) value as measured by H$_2$-TIR of greater than 500 µmol/g at 600° C. after aging at 800° C. in an air atmosphere for 2 hours. In some embodiments, the composition has D-OSC value as measured by H$_2$-TIR of less than 1500 µmol/g at 600° C. after aging at 800° C. in an air atmosphere for 2 hours.

It is preferred that the composition has a D-OSC value as measured by H$_2$-TIR of greater than 875 µmol/g at 700° C. after aging at 800° C. in an air atmosphere for 2 hours, more preferably greater than 950 µmol/g at 800° C.

According to a eighteenth aspect of the invention, and/or in combination with the compositional features defined above, there is provided a composition comprising zirconium oxide and cerium oxide having:

(a) a Ce:Zr molar ratio of 1 or less, and
(b) a cerium oxide content of at least 5% by weight, wherein the increase in the average pore diameter of the composition as measured by N$_2$ physisorption after hydrothermal aging at 1100° C. for 12 hours in an air atmosphere comprising 10% by volume of water, is no greater than 50%.

It is preferred that increase in the average pore diameter of the composition as measured by N$_2$ physisorption after hydrothermal aging at 1100° C. for 12 hours in an air atmosphere comprising 10% by volume of water, is no greater than 30%, more preferably no greater than 10%.

According to an nineteenth aspect of the invention, and/or in combination with the compositional features defined above, there is provided a composition comprising zirconium oxide and cerium oxide having:

(a) a Ce:Zr molar ratio of 1 or less, and
(b) a cerium oxide content of at least 5% by weight, wherein greater than 80% of the total pore volume as measured by N$_2$ physisorption consists of pores with an average diameter of between 18 nm and 78 nm after aging at 1100° C. in an air atmosphere for 6 hours. It is preferred that greater than 85% of the total pore volume as measured by N$_2$ physisorption consists of pores with an average diameter of between 18 nm and 78 nm after aging at 1100° C. in an air atmosphere for 6 hours.

It is preferred that the compositions defined herein, or made by the process defined above, comprise one or more rare earth oxides other than cerium oxide. Each of these one or more rare earth oxides other than cerium oxide are preferably individually present in an amount of 1-15% by weight, in some embodiments 1.5-10% by weight, in further embodiments 2-6% by weight. The rare earth elements are scandium, yttrium, lanthanum, praseodymium, neodymium, promethium, samarium, europium, gadolinium, terbium, dysprosium, holmium, erbium, thulium, ytterbium and lutetium. Preferred rare earth oxides other than cerium are yttrium oxide (yttria), neodymium oxide, praseodymium oxide and lanthanum oxide. In a preferred embodiment of the invention, the composition comprises 3-7% by weight, preferably about 5% by weight, of praseodymium oxide and 3-7% by weight, preferably about 5% by weight, of lanthanum oxide. In some embodiments, the composition may also comprise one or more of tin oxide, niobium oxide, tungsten oxide, silica and iron oxide. The total amount of rare earth oxides other than cerium oxide is preferably less than 30% by weight. In some embodiments, the total amount of rare earth oxides other than cerium oxide is less than 20% by weight, optionally less than 15% by weight.

Preferably, the compositions defined herein, or made by the process defined above, comprise 5-50% by weight of cerium oxide, more preferably 10-50% by weight cerium oxide, even more preferably 20-45% by weight, in some embodiments about 40% by weight cerium oxide.

It is preferred that the compositions derived herein, or made by the process defined above, comprise at least 20% by weight of zirconium oxide, more preferably at least 30% by weight.

Preferably, in the compositions defined herein, or made by the process defined above, the total amount of cerium oxide and zirconium oxide is at least 80% by weight, more preferably at least 85% by weight.

The compositions defined herein, or made by the process defined above, generally comprise hafnium oxide (hafnia) as an impurity. This is normally derived from the material which is used as the source of zirconium. The amount of hafnia generally depends on the level of zirconium, but is normally less than 2% by weight, and often less than 1% by weight.

It is preferred that the compositions defined herein, or made by the process defined above, comprise less than 0.3% by weight of $SO_4$, preferably less than 0.2% by weight, more preferably less than 0.1% by weight. An upper limit of 0.1% by weight is acceptable for most uses, although the $SO_4$ content can be further reduced by repeating the relevant washing steps of the preparative method described below.

More generally, the compositions defined herein, or made by the process defined above, preferably comprise incidental impurities (i.e., those not deliberately added) in an amount of up to 0.5% by weight. The term "incidental impurities" does not include, for example, carbonate, sulphate or nitrate ions since these may be deliberately added.

In addition, in some embodiments the compositions defined herein, or made by the process defined above, comprise less than 0.10% by weight of Cl, preferably less than 0.05% by weight, more preferably less than 0.02% by weight. An upper limit of 0.02% by weight is acceptable for most uses, although the Cl content can be further reduced by repeating the relevant washing steps of the preparative method described below.

It is preferred that the compositions defined herein, or made by the process defined above, comprise less than 250 ppm of Na or K, preferably less than 200 ppm, more preferably less than 125 ppm. An upper limit of 125 ppm is acceptable for most uses, although the sodium or potassium content can be further reduced by repeating the relevant washing steps of the preparative method described below.

In some embodiments, the compositions defined herein, or made by the process defined above, may include up to 5% by weight of a platinum group metal, normally up to 2% by weight, in some embodiments around 1% by weight of a platinum group metal (PGM). As noted above, the PGMs are palladium, platinum, rhodium, ruthenium, iridium and/or osmium. Palladium, rhodium and platinum and the most commonly used PGMs. These metals are normally added into the composition as an aqueous solution, normally in a formulation with other components, coated onto a monolith and then calcined.

Preferably, for the compositions defined herein, or made by the process defined above, one type of diffraction peak for zirconia in either a tetragonal system or in a cubic system is observed on an XRD scan.

When the compositions defined herein, or made by the process defined above, are aged, especially in hydrothermal aging conditions at high temperatures, we see that the pore volume in the meso porous region can be impressively retained. This effect can have two benefits, one is to retain a pore size that minimizes any gas diffusion limitations in the resulting solid, the second is to retain sufficient volume of pores of an appropriate size such that reduction of catalytic activity by loss of PGM dispersion is minimised.

The lack of change of pore size distribution and pore volume is indicative of the inhibition of solid state sintering processes, which can thus lead to a desirable small change in PGM dispersion via encapsulation. It is not unreasonable to propose that such behavior could enable catalysts to achieve the same activity with less PGM, thus reducing the cost of the catalyst system.

According to a further aspect of the invention, there is provided an alternative process for preparing a composition as defined herein, the process comprising the steps of:
(a) preparing a zirconium hydroxynitrate solution or a zirconium oxynitrate solution,
(b) thermally treating the solution,
(c) cooling the solution,
(d) adding a bidentate or polydentate ligand,
(e) adding a cerium containing solution, and
(f) adding a base to adjust the pH of the solution to >8 in order to precipitate a cerium-zirconium mixed hydroxide.

In step (a) it is preferred that the nitrate to zirconium molar ratio is less than 1.6. Step (b) is carried out in order to ensure optimum polymer/oligomer size for mesoporous powder preparation. The thermal treatment normally comprises heating the solution to a temperature above room temperature.

During step (b), or between steps (a) and (b), the process may comprise the optional step of adding surfactants or organic templating molecules such as polyols, amino acids, α-hydroxy acids, carbohydrate polymers, and/or sulphate derivatives to the solution. In step (c), the solution is preferably cooled to below 40° C. In step (d) the bi/polydentate ligand may be phosphate, nitrate or sulphate, or a mixture thereof. In step (e), soluble solutions comprising rare earth metals other than cerium can be added. This is in order to provide a mixed zirconium-rare earth dispersion with intimate mixing of the zirconium and rare earth elements. Alternatively, one can add the sulphate ions and rare earth nitrates simultaneously to the zirconium nitrate solution/sol in order to provide good mixing of the components. In this case, zirconium oxychloride can also be used. It is also possible to add rare earth metals or other elements such as tin, niobium, tungsten, silica, strontium or iron at any of the aforementioned stages, or during or after step (f).

Once the zirconium and rare earths are mixed adequately, as set out in step (f) above the addition of base to pH>8 is required to precipitate a hydrated mixed zirconium rare earth suspension. In an alternative embodiment, the addition of base to adjust the pH of the solution to >8 can be carried out before step (e). In this embodiment, the zirconium hydroxide is precipitated before the addition of the cerium containing solution (and optional other rare earths). The pH that the solution can be adjusted to depends on the base used. The base can be either ammonium hydroxide or an alkali metal hydroxide, preferably sodium hydroxide. For ammonium hydroxide, the maximum pH that can be achieved is normally about pH 10. For alkali metal hydroxides, the pH can be adjusted to pH 11-13 or higher. Hydrogen peroxide may also be added to the precipitate (i.e., after step (f) or before the addition of base (i.e., before step (f)). The precipitate optionally may be heated to 50° C. *minimum*, for 30 minutes to 24 hours. After step (f) the process may comprise a further step of filtering and/or washing the precipitate. This is done in order to remove impurity ions such as sodium, potassium, sulphate, phosphate and/or nitrate. Alkali metal ions may be removed by an additional step of reslurrying the washed precipitate cake and adding a mineral acid. The mineral acid is preferably nitric acid from about 10% to 60% by weight concentration. The pH of the solution is generally adjusted to a pH less than 9, preferably adjusted to between pH 7-9. After an optional further filtration step the process may comprise the optional step of redispersing the precipitate in an aqueous medium and heating the resulting dispersed slurry or wet cake to between 100° C. and 350° C., preferably between 100° C. to 200° C. This can be in a sealed reaction vessel such as an autoclave or up to 100° C. in an open vessel.

The process can then include the optional step of drying the dispersed slurry or wet cake. This can be in a drying device such as spray drier, static oven, indirectly heated jacketed vessel, or indeed any lab or commercial scale drier. Optionally the slurry or cake can be directly introduced into a kiln for calcination.

The calcination step is performed by calcination at about 800° C.-1000° C., preferably around 900° C. in a gas fired or electrically fired kiln, normally in air. Generally, the time at temperature is at least 30 minutes, more usually 2-3 hours. The time at temperature can depend on the thermal mass being calcined and it is necessary for consistency that adequate time at temperature is utilised to ensure the required degree of crystallinity, homogeneity and development of microstructure of the solid.

The calcined powder can optionally be deagglomerated or milled using known methods such as sieving, sifting, opposed air milling, impact milling, ball milling, bead milling and the like. The powder can also be milled in the form of a slurry (i.e., "wet") in an aqueous or non-aqueous liquid.

Calcining is preferably carried out at 800-1000° C. for 2-4 hours, more preferably at around 920° C. for around 3 hours. Optionally, the solid can be milled.

According to a further aspect of the invention, there is provided a catalytic system comprising a composition as defined herein, or made by the processes defined above. In some embodiments, one more PGMs and/or transition metals may be added to the composition. The composition can then be used as a catalytic converter. In some embodiments, the composition may be mixed with other active components (ie other catalytically active materials) to produce a fully formulated catalyst. According to another aspect of the invention, there is provided a process for treating an exhaust gas from vehicle engine comprising contacting the exhaust gas with a composition as defined herein, or made by the processes defined above. In some embodiments, the process for treating comprises one of more of (a) reduction of nitrogen oxides to nitrogen, (b) oxidation of carbon monoxide to carbon dioxide, and (c) oxidation of hydrocarbons, in the exhaust gas. In some embodiments, the process for treating comprises (a) reduction of nitrogen oxides to nitrogen, (b) oxidation of carbon monoxide to carbon dioxide, and (c) oxidation of hydrocarbons, in the exhaust gas. The invention also relates to a diesel oxidation catalyst, a $NO_x$ trap, a passive $NO_x$ absorber, a gasoline particulate filter coating or a lean $NO_x$ trap comprising the composition as defined herein, or made by the processes defined above. According to a further aspect of the invention, there is provided a process for treating an exhaust gas from diesel engine comprising contacting the exhaust gas with a composition as defined herein, or made by the processes defined above, or a mixture of the composition with either a zeolite or a metal-exchanged zeolite. This process may be a Selective Catalytic Reduction (SCR) process. According to another aspect of the invention, there is provided a process for oxidising soot in an exhaust stream from vehicle engine comprising contacting the exhaust stream with a composition as defined herein, or made by the processes defined above.

This invention will be further described by reference to the following Figures which are not intended to limit the scope of the invention claimed, in which:

The invention will now be described by way of example with reference to the following Examples.

Comparative Example 1—40Ce/5La/5Pr

A sample was prepared according to the composition defined above, i.e., 40% by weight cerium (IV) oxide, 5% by weight lanthanum oxide, 5% by weight praseodymium oxide and the remainder (i.e. ~50% by weight) zirconium dioxide.

118.8 g of zirconium basic carbonate (ZBC, 42.1% $ZrO_2$) was dissolved in 126.9 g of nitric acid. This solution was then heated to 60° C. 119.5 g of water was then added. In this example, a complexing agent was not added to the solution. This solution was then heated to boiling and boiled for 2 hours.

After cooling to room temperature 156.3 g cerium (Ill) nitrate (25.6% $CeO_2$), 23.3 g lanthanum nitrate (21.5% $La_2O_3$), 25.6 g praseodymium nitrate (19.5% $Pr_6O_{11}$) solutions and 355.6 g of de-ionised water were added. 98.7 g of sulphuric acid was then added.

A 10 wt % aqueous solution of NaOH was then added dropwise to the mixture with stirring. Stirring and addition of the 10 wt % aqueous solution of NaOH was continued until the pH became approximately 8. At this point, a 28 wt % aqueous solution of NaOH was substituted for the 10 wt % solution and the dropwise addition was continued with stirring until the pH became approximately 13.

The resulting slurry was then filtered. The filter cake was washed with deionised water at 60° C. The cake was then re-dispersed and then adjusted to pH 8.0 with a 30 wt % solution of nitric acid. The resulting slurry was then filtered. The filter cake was washed with deionised water at 60° C.

The final filter cake was heated in an autoclave to 127° C. for 1 hour. The resulting suspension was then filtered and the resulting filter cake was calcined in air for 3 hours at 930° C., and milled, to give a cerium-zirconium based mixed oxide.

Preparative Example 2—40Ce/5La/5Pr

A sample was prepared according to the composition defined above, i.e. 40% by weight cerium (IV) oxide, 5% by weight lanthanum oxide, 5% by weight praseodymium oxide and the remainder (i.e. ~50% by weight) zirconium dioxide.

119.9 g of zirconium basic carbonate (ZBC, 41.7% $ZrO_2$) was dissolved in 126.9 g of nitric acid. This solution was then heated to 60° C. 3.0 g of soluble starch was added to the solution, along with 108.0 g of water. This solution was then heated to boiling and boiled for 2 hours.

After cooling to room temperature 156.3 g cerium (Ill) nitrate (25.6% $CeO_2$), 23.3 g lanthanum nitrate (21.5% $La_2O_3$), 25.6 g praseodymium nitrate (19.5% $Pr_6O_{11}$) solutions and 355.6 g of de-ionised water were added. 98.7 g of sulphuric acid was then added.

The same procedure as Preparative Example 3 below was then followed, up to the formation of the final filter cake.

The final filter cake was calcined in air for 2 hours at 850° C. and then milled.

Preparative Example 3—40Ce/5La/5Pr

A sample was prepared according to the composition defined above, i.e. 40% by weight cerium (IV) oxide, 5% by weight lanthanum oxide, 5% by weight praseodymium oxide and the remainder (i.e. ~50% by weight) zirconium dioxide.

118.8 g of zirconium basic carbonate (ZBC, 42.1% $ZrO_2$) was dissolved in 126.9 g of nitric acid. This solution was then heated to 60° C. 0.92 g of mandelic acid was added to the solution, along with 110.2 g of water. This solution was then heated to boiling and boiled for 2 hours.

After cooling to room temperature 161.9 g cerium (Ill) nitrate (24.7% $CeO_2$), 24.2 g lanthanum nitrate (20.7% $La_2O_3$), 23.4 g praseodymium nitrate (21.4% $Pr_6O_{11}$) solutions and 362.9 g of de-ionised water were added. 98.7 g of sulphuric acid was then added.

The pH of the solution was then adjusted to pH 13.0 with a dilute sodium hydroxide solution. 45.2 g of a 35 wt % hydrogen peroxide solution was then added.

The resulting slurry was then filtered. The filter cake was washed with deionised water at 60° C. The cake was then re-dispersed and then adjusted to pH 8.0 with a 30 wt % solution of nitric acid. The resulting slurry was then filtered. The filter cake was washed with deionised water at 60° C.

The precipitate was calcined in air for 3 hours at 920° C. and milled.

Preparative Examples 4a and 4b—40Ce/5La/5Pr

A sample was prepared according to the composition defined above, i.e. 40% by weight cerium (IV) oxide, 5% by weight lanthanum oxide, 5% by weight praseodymium oxide and the remainder (i.e. ~50% by weight) zirconium dioxide.

The same procedure as Preparative Example 3 was followed, except that 124.4 g of nitric acid was used to dissolve the ZBC, and 96.7 g of sulphuric acid was subsequently added. Preparative example 4a was thus prepared.

Preparative example 4b was prepared by subjecting 4a to an additional milling step.

Preparative Example 5—40Ce/5La/5Pr

The same procedure as Preparative Example 3 was followed, up to the formation of the final filter cake.

The final filter cake was heated in an autoclave to 127° C. for 1 hour.

The resulting suspension was then dried at 110° C. in a static air oven. The solid was calcined in air for 3 hours at 930° C. and milled.

Preparative Example 6—40Ce/5La/5Pr

A sample was prepared according to the composition defined above, i.e. 40% by weight cerium (IV) oxide, 5% by weight lanthanum oxide, 5% by weight praseodymium oxide and the remainder (i.e. ~50% by weight) zirconium dioxide.

117.1 g of zirconium basic carbonate (ZBC, 42.7% $ZrO_2$) was dissolved in 120.6 g of nitric acid. This solution was then heated to 60° C. 0.92 g of mandelic acid was added to the solution, along with 118.5 g of water. This solution was then heated to boiling and boiled for 2 hours.

After cooling to room temperature, 296.5 g of sodium nitrate solution, 233.1 g of de-ionised water and 98.7 g of sulphuric acid was then added. This was followed by 161.9 g cerium (Ill) nitrate (24.7% $CeO_2$), 22.8 g lanthanum nitrate (21.9% $La_2O_3$) and 25.6 g praseodymium nitrate (19.5% $Pr_6O_{11}$) solutions.

The same procedure as Preparative Example 3 was then followed, up to the formation of the final filter cake.

The final filter cake was calcined in air for 3 hours at 910° C. and then milled.

Comparative Example 7—40Ce/5La/5Pr

Mixed solution A was prepared by combining 241.5 g of ZOC (20.7% $ZrO_2$), 156.3 g cerium (Ill) nitrate (25.6% $CeO_2$), 23.3 g lanthanum nitrate (21.5% $La_2O_3$), 26.7 g praseodymium nitrate (18.8% $Pr_6O_{11}$), 121.0 g of sulphuric acid and 98.0 g of de-ionised water.

A reaction vessel was charged with 765 g of de-ionised water, at room temperature. To this was added 45.2 g of 35% hydrogen peroxide solution, and the pH adjusted to ~9.75 with sodium hydroxide solution.

Mixed solution A was titrated against 27% sodium hydroxide solution, into the reaction vessel, at such a rate as to complete the addition over ~80 mins whilst maintaining a system pH of 9.5-10. Following this, the pH was increased to 13 with further addition of 27% sodium hydroxide. In this example, a complexing agent was not added to the solution.

The resulting slurry was then filtered. The filter cake was washed with deionised water at 60° C. The cake was then re-dispersed and then adjusted to pH 8.0 with a 30 wt % solution of nitric acid. The resulting slurry was then filtered. The filter cake was washed with deionised water at 60° C.

The precipitate was hydrothermally treated at 127° C. for 1 hour. The resulting suspension was then dried at 110° C. in a static air oven and calcined in air for 2 hours at 800° C. and milled.

Comparative Example 8—40Ce/5La/5Pr

A sample was prepared according to the composition defined above, i.e. 40% by weight cerium (IV) oxide, 5% by weight lanthanum oxide, 5% by weight praseodymium oxide and the remainder (i.e. ~50% by weight) zirconium dioxide. The sample was prepared according to patent EP1444036B1 (i.e., no complexing agent).

Preparative Example 9—40Ce/5La/5Pr

This was prepared in the same way as Preparative Example 6, except that 126.9 g of nitric acid was used to dissolve the ZBC. The precipitate was heated in an autoclave to 127° C. for 1 hour. The resulting suspension was then filtered and the resulting filter cake was calcined in air for 3 hours at 930° C. and milled.

Comparative Example 10—40Ce/5La/5Pr

A sample was prepared according to the composition defined above, i.e. 40% by weight cerium (IV) oxide, 5% by weight lanthanum oxide, 5% by weight praseodymium oxide and the remainder (i.e. ~50% by weight) zirconium dioxide. A zirconium basic sulphate precursor was prepared according to the following reference [S. M. Flask, I. A. Sheka, "*Interaction of zirconium oxychloride and sulfuric acid in aqueous solution*", Russ. J. Inorg. Chem. 1969, 17 (1), 60-65]. A sample of this precursor containing 50 g $ZrO_2$ equivalent was mixed with 161.9 g cerium (Ill) nitrate (24.7% $CeO_2$), 22.8 g lanthanum nitrate (21.9% $La_2O_3$) and 25.6 g praseodymium nitrate (19.5% $Pr_6O_{11}$) solutions. In this example, a complexing agent was not added to the solution. The pH of the solution was then adjusted to pH 13.0 with 27% sodium hydroxide solution. 45.2 g of a 35 wt % hydrogen peroxide solution was then added.

The sample was calcined in air for 2 hours at 600° C.

Preparative Example 11—45Ce/5La/5Y

A sample was prepared according to the composition defined above, i.e. 45% by weight cerium (IV) oxide, 5% by weight lanthanum oxide, 5% by weight yttrium oxide and the remainder (i.e. ~45% by weight) zirconium dioxide.

109.0 g of zirconium basic carbonate (ZBC, 41.3% $ZrO_2$) was dissolved in 107.4 g of nitric acid. This solution was then heated to 60° C. 0.83 g of mandelic acid was added to the solution, along with 104.2 g of water. This solution was then heated to boiling and boiled for 2 hours.

After cooling to room temperature, 266.8 g of sodium nitrate solution, 248.3 g of de-ionised water and 88.8 g of sulphuric acid was then added. This was followed by 182.2 g cerium (Ill) nitrate (24.7% $CeO_2$), 22.8 g lanthanum nitrate (21.9% $La_2O_3$) and 26.6 g yttrium nitrate (18.8% $Y_2O_3$) solutions.

The same procedure as Preparative Example 3 was then followed, up to the formation of the final filter cake.

The final filter cake was hydrothermally treated at 127° C. for 1 hour. The resulting suspension was then dried at 110° C. in a static air oven and calcined in air for 3 hours at 900° C. and then milled.

Preparative Example 12—45Ce/5La/5Y

This was prepared in the same way as Preparative Example 10, except that 116.8 g of nitric acid was used to dissolve the ZBC, and 1.07 g of mandelic was added. The final filter cake was not hydrothermally treated. It was calcined in air for 3 hours at 900° C. and then milled.

Preparative Example 13—35.5Ce/5.5La

A sample was prepared according to the composition defined above, i.e. 35.5% by weight cerium (IV) oxide, 5.5% by weight lanthanum oxide and the remainder (i.e. ~59% by weight) zirconium dioxide.

142.9 g of zirconium basic carbonate (ZBC, 41.3% $ZrO_2$) was dissolved in 149.8 g of nitric acid. This solution was then heated to 60° C. 1.09 g of mandelic acid was added to the solution, along with 127.6 g of water. This solution was then heated to boiling and boiled for 2 hours.

After cooling to room temperature 138.7 g cerium (Ill) nitrate (25.6% $CeO_2$), 25.6 g lanthanum nitrate (21.5% $La_2O_3$) solutions and 306.7 g of de-ionised water were added. 98.7 g of sulphuric acid was then added.

The same procedure as Preparative Example 3 was then followed, up to the formation of the final filter cake.

The final filter cake was calcined in air for 3 hours at 900° C. and then milled.

Preparative Example 14—25Ce/3.5La/4Y

A sample was prepared according to the composition defined above, i.e. 25% by weight cerium (IV) oxide, 3.5% by weight lanthanum oxide, 4% by weight yttrium oxide and the remainder (i.e. ~67.5% by weight) zirconium dioxide.

163.4 g of zirconium basic carbonate (ZBC, 41.3% $ZrO_2$) was dissolved in 188.5 g of nitric acid. This solution was then heated to 60° C. 0.54 g of mandelic acid was added to the solution, along with 129.7 g of water. This solution was then heated to boiling and boiled for 2 hours.

After cooling to room temperature, 400.3 g of sodium nitrate solution, 444.4 g of de-ionised water and 133.3 g of sulphuric acid was then added. This was followed by 101.2 g cerium (Ill) nitrate (24.7% $CeO_2$), 16.0 g lanthanum nitrate (21.9% $La_2O_3$) and 21.3 g yttrium nitrate (18.8% $Y_2O_3$) solutions.

The same procedure as Preparative Example 3 was then followed, up to the formation of the final filter cake.

The final filter cake was calcined in air for 3 hours at 900° C. and then milled.

Preparative Example 15—20Ce/1.5La/5Nd

A sample was prepared according to the composition defined above, i.e. 20% by weight cerium (IV) oxide, 1.5% by weight lanthanum oxide, 5% by weight neodymium oxide and the remainder (i.e. ~73.5% by weight) zirconium dioxide.

178.0 g of zirconium basic carbonate (ZBC, 41.3% $ZrO_2$) was dissolved in 205.3 g of nitric acid. This solution was then heated to 60° C. 0.59 g of mandelic acid was added to the solution, along with 141.1 g of water. This solution was then heated to boiling and boiled for 2 hours.

After cooling to room temperature, 491.1 g of sodium nitrate solution, 302.3 g of de-ionised water and 145.1 g of sulphuric acid was then added. This was followed by 81.0 g cerium (Ill) nitrate (24.7% $CeO_2$), 6.9 g lanthanum nitrate (21.9% $La_2O_3$) and 23.5 g neodymium nitrate (21.3% $Nd_2O_3$) solutions.

The same procedure as Preparative Example 3 was then followed, up to the formation of the final filter cake.

The final filter cake was calcined in air for 3 hours at 900° C. and then milled.

Example A

The samples prepared above were analysed as prepared (i.e., "Fresh") for their surface area (SA), total pore volume (TPV, by $N_2$ physisorption), crystallite size (CS, by applying the Scherrer equation to the relevant peak in its XRD scan) and average pore diameter (APD, by $N_2$ physisorption). This data is shown in Table 1 below.

Figure 1:
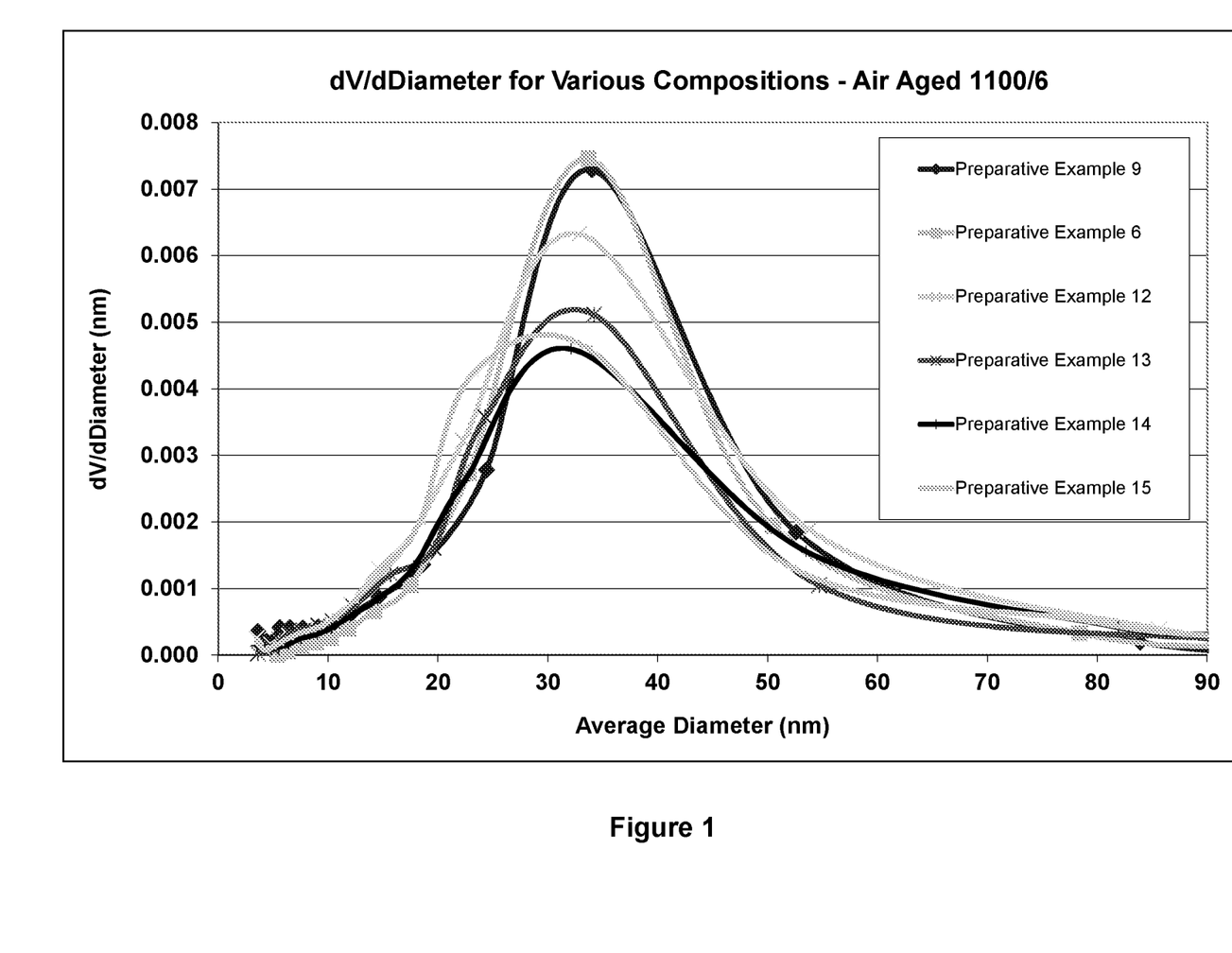
FIG. 1 shows air aged (1100° C./6 hr) porosity data for the compositions of Preparative Examples 6, 9 and 11-14.
Figure 2:
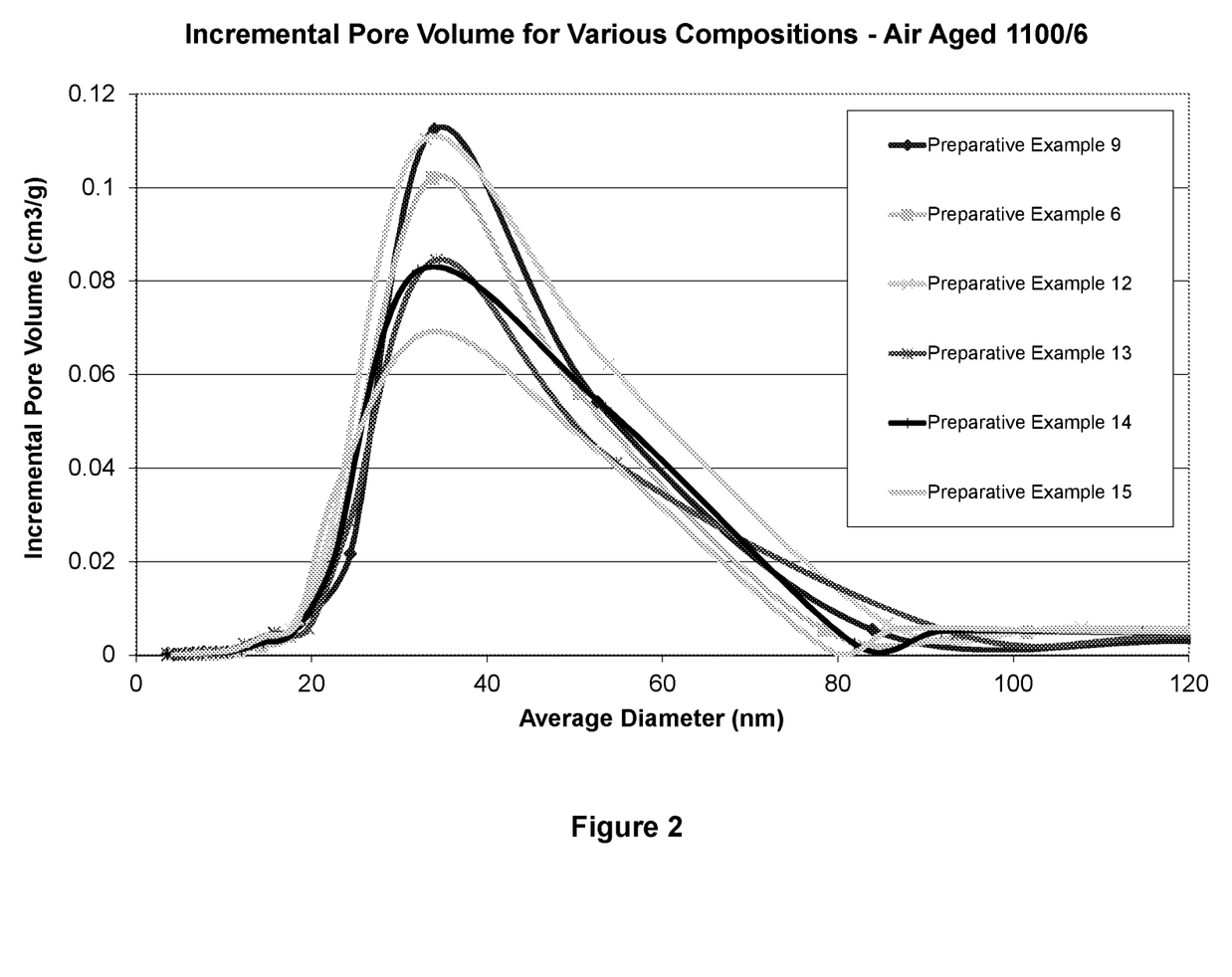
FIG. 2 shows air aged (1100° C./6 hr) incremental pore volume data for the compositions of Preparative Examples 6, 9 and 11-14.
Figure 3:
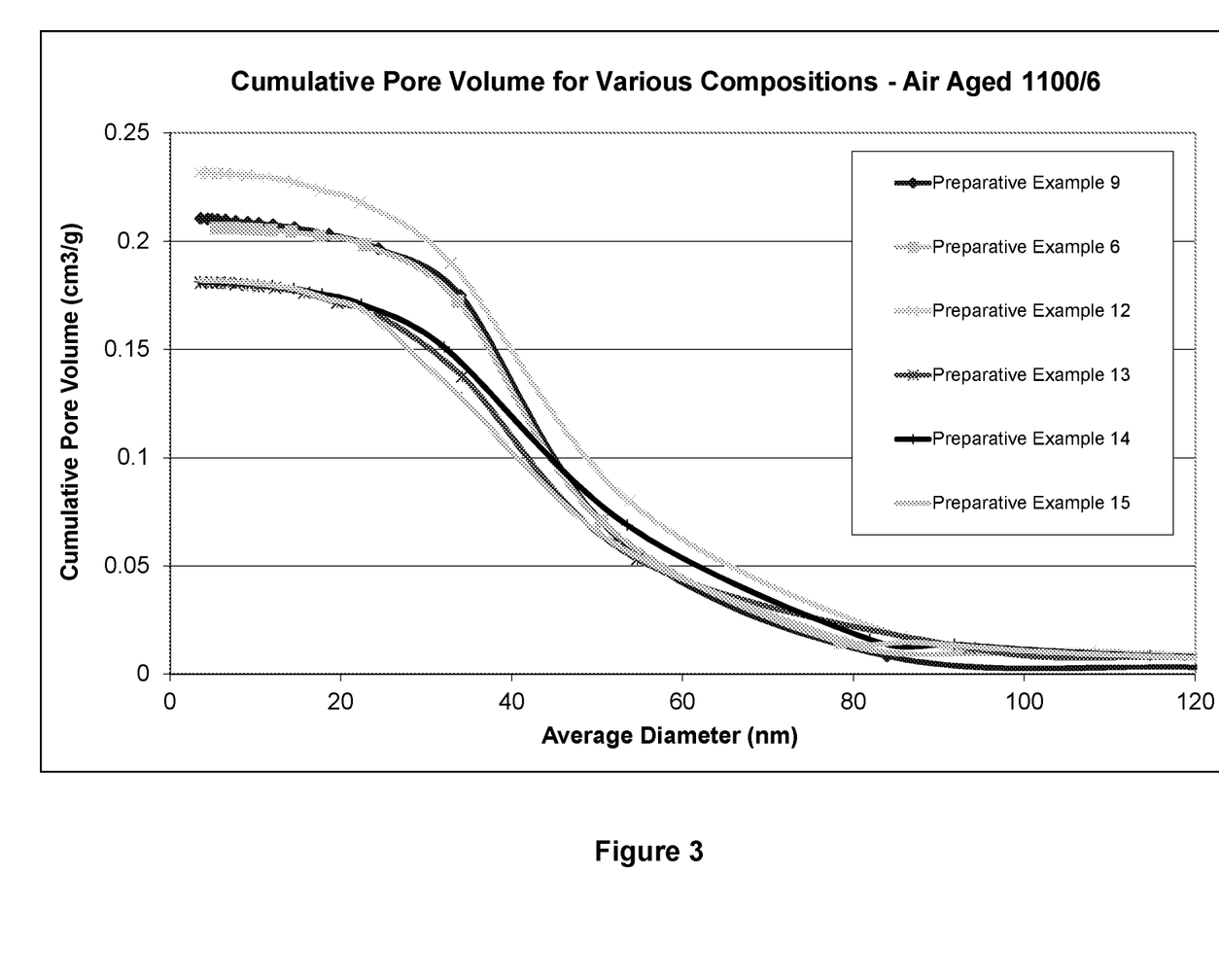
FIG. 3 shows air aged (1100° C./6 hr) incremental pore volume data for the compositions of Preparative Examples 6, 9 and 11-14.
Figure 4:
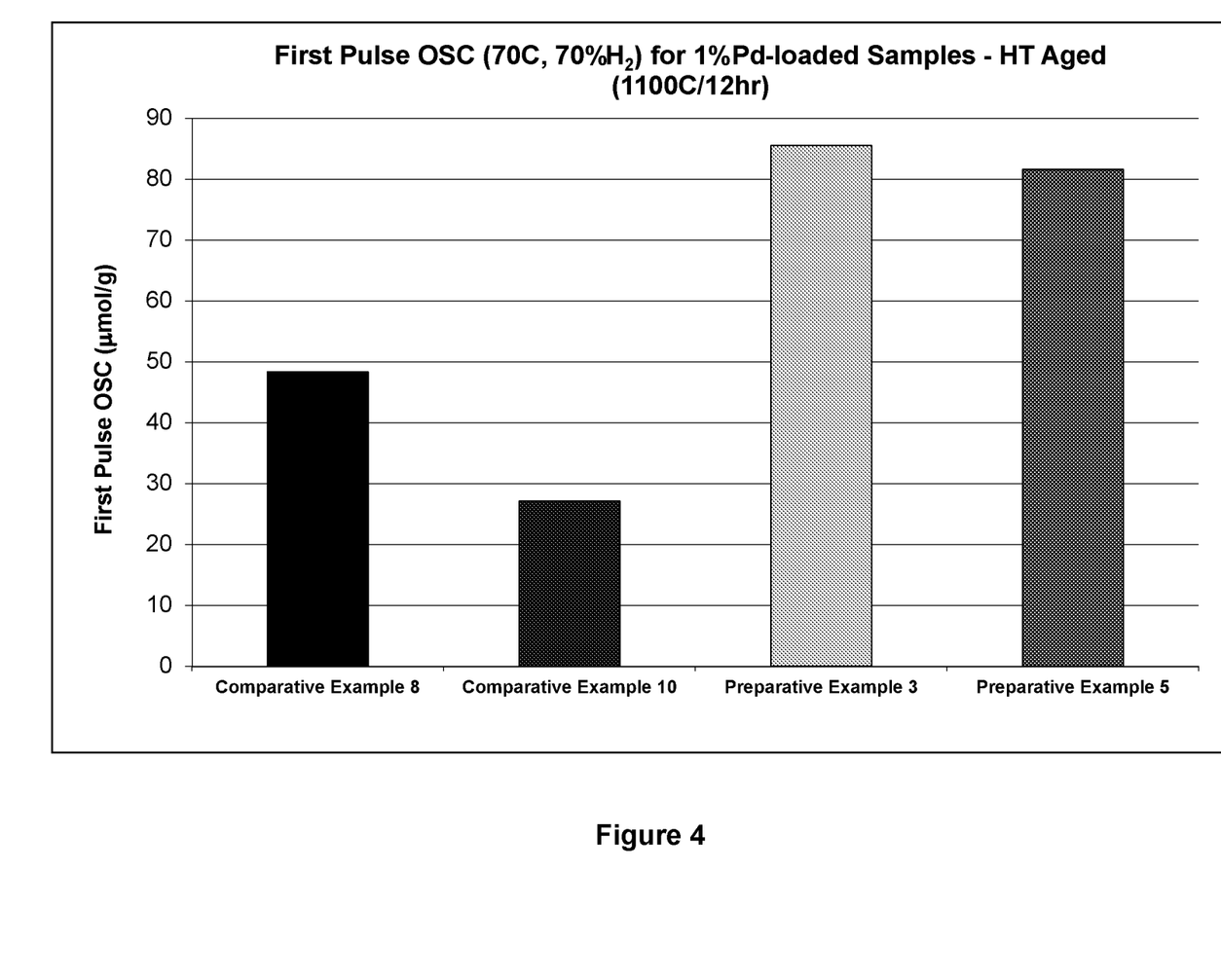
FIG. 4 shows $H_2$ pulse data for Preparative Examples 3, 5 and 8 and Comparative Example 1.
Figure 5:
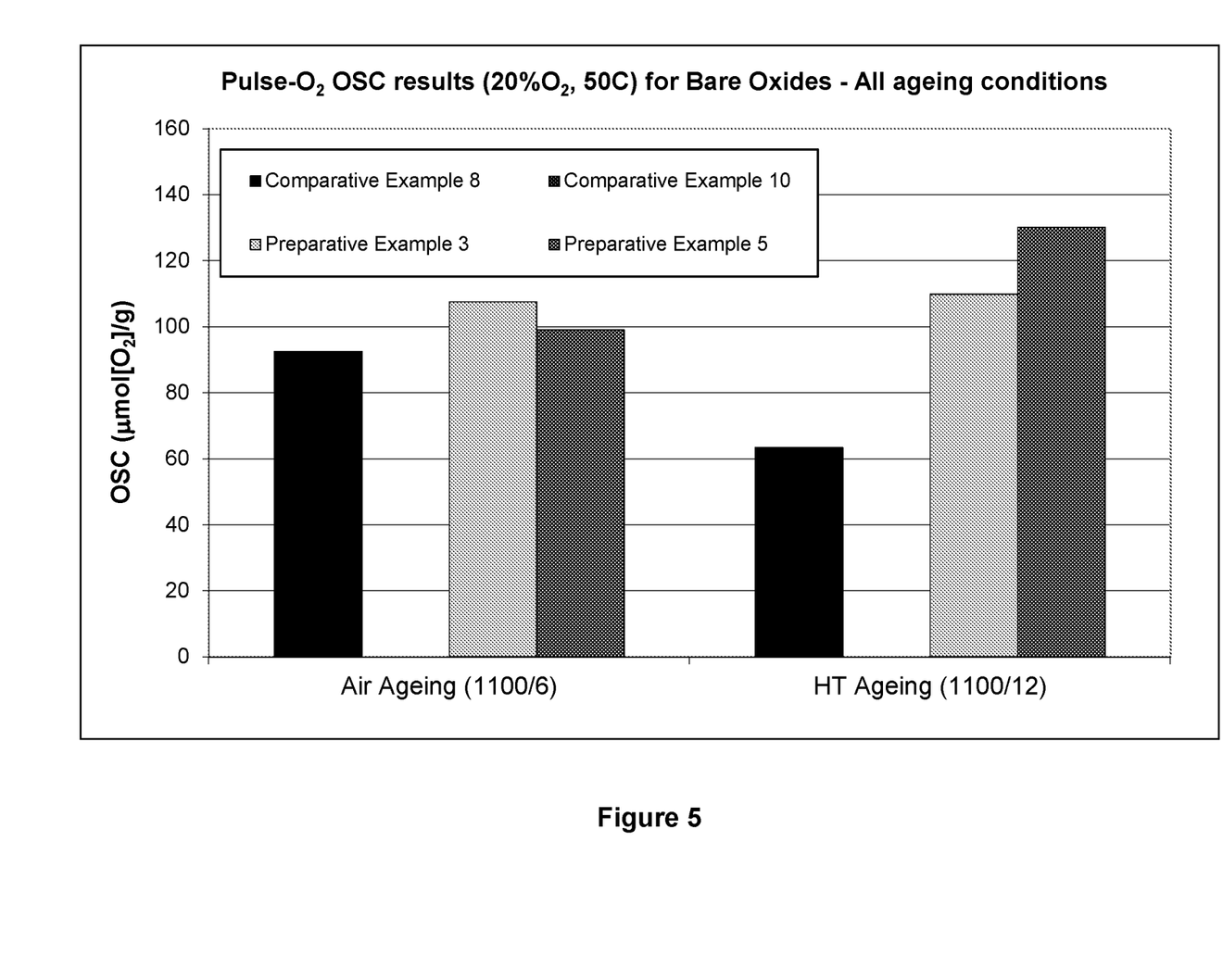
FIG. 5 shows $O_2$ pulse data for Preparative Examples 3, 5 and 8 and Comparative Example 1.

The results for Preparative Examples 6, 9 and 12-15 aged in air at 1100° C. for 6 hours are shown graphically in FIG. 1. The dV/dDiameter measurement on the y-axis of this graph is effectively a measurement of the number of pores of a particular size, with the average pore diameter shown along the x-axis. This data shows the improved porosity of the compositions of the invention after aging in air at 1100° C. for 6 hours. FIG. 2 shows the incremental pore volume for these samples, and FIG. 3 shows the cumulative pore volume. FIGS. 4 and 5 show $H_2$ and $O_2$ pulse data respectively for Preparative Examples 3 and 5, as well as Comparative Examples 8 and 10. In FIG. 5, the $O_2$ pulse data for Comparative Example 10 is zero at both aging conditions.

TABLE 1

| Sample | Fresh | | | | 950° C./2 (air) | | | 1000° C./4 (air) | | | |
|---|---|---|---|---|---|---|---|---|---|---|---|
| | SA ($m^2/g$) | TPV ($cm^3/g$) | APD (nm) | CS (nm) | SA ($m^2/g$) | TPV ($cm^3/g$) | CS (nm) | SA ($m^2/g$) | TPV ($cm^3/g$) | APD (nm) | CS (nm) |
| Comparative Example 1 | 74 | 0.35 | 18.9 | 7.7 | | | | 51 | 0.29 | 22.6 | 10 |
| Comparative Example 8 | 88 | 0.38 | 17.3 | 5 | 64 | 0.33 | 7 | 48 | 0.29 | 24.5 | 9 |
| Comparative Example 10 | 71 | 0.08 | 4.6 | 5.5 | | | | 15 | 0.04 | 10.2 | 11 |
| Comparative Example 7 | 70 | 0.35 | 20.1 | 5.6 | 49 | 0.30 | 8 | 43 | 0.30 | 27.5 | 9.6 |
| Preparative Example 3 | 77 | 0.34 | 17.9 | 7.9 | 65 | 0.32 | 8.5 | 57 | 0.33 | 22.8 | 10 |
| Preparative Example 4b | 83 | 0.46 | 22.0 | 8.1 | 73 | 0.42 | 8.9 | 57 | 0.40 | 28.2 | 10 |
| Preparative Example 4a | 83 | 0.52 | 24.9 | 8.1 | | | | 62 | 0.41 | 26.2 | 11 |
| Preparative Example 5 | 82 | 0.39 | 19.1 | 8.1 | 64 | 0.37 | 9.2 | 55 | 0.33 | 24.3 | 11 |
| Preparative Example 6 | 85 | 0.50 | 23.5 | 7.9 | | | | 61 | 0.40 | 26.5 | 10 |
| Preparative Example 9 | 79 | 0.40 | 20.5 | 7.6 | | | | | | | |
| Preparative Example 2 | 87 | 0.42 | 23.4 | 6.3 | | | | | | | |
| Preparative Example 14 | 70 | 0.40 | 22.8 | 10 | | | | | | | |
| Preparative Example 15 | 76 | 0.45 | 23.8 | 12 | | | | | | | |
| Preparative Example 13 | 82 | 0.41 | 19.9 | 7.3 | | | | | | | |
| Preparative Example 11 | 90 | 0.54 | 24.0 | 7.6 | | | | 57 | 0.38 | 26.3 | 10 |
| Preparative Example 12 | 82 | 0.44 | 21.4 | 7.2 | | | | | | | |

| Sample | 1050° C./2 (air) | | | 1100° C./6 (air) | | | | 1100° C./12 (HT) | | | |
|---|---|---|---|---|---|---|---|---|---|---|---|
| | SA ($m^2/g$) | TPV ($cm^3/g$) | CS (nm) | SA ($m^2/g$) | TPV ($cm^3/g$) | APD (nm) | CS (nm) | SA ($m^2/g$) | TPV ($cm^3/g$) | APD (nm) | CS (nm) |
| Comparative Example 1 | | | | 24 | 0.14 | 23.9 | 19 | | | | |
| Comparative Example 8 | 39 | 0.24 | 11 | 17 | 0.13 | 31.3 | 17 | 19 | 0.15 | 31.9 | 17 |
| Comparative Example 10 | | | | 3.5 | 0.01 | 9.7 | 19 | 3.6 | 0.01 | 11.8 | 19 |
| Comparative Example 7 | 34 | 0.23 | 12 | 21 | 0.15 | 28.7 | 18 | 21 | 0.15 | 28.6 | 17 |
| Preparative Example 3 | 41 | 0.22 | 13 | 24 | 0.13 | 21.8 | 19 | 23 | 0.13 | 23.1 | 18 |
| Preparative Example 4b | 41 | 0.25 | 13 | 23 | 0.15 | 25.9 | 20 | 20 | 0.14 | 27.6 | 19 |
| Preparative Example 4a | | | | 22 | 0.15 | 28.3 | 20 | 20 | 0.14 | 26.9 | 19 |
| Preparative Example 5 | 42 | 0.29 | 13 | 21 | 0.14 | 27.0 | 21 | 21 | 0.16 | 29.1 | 19 |
| Preparative Example 6 | | | | 23 | 0.20 | 35.3 | 20 | 21 | 0.17 | 31.2 | 20 |
| Preparative Example 9 | | | | 28 | 0.21 | 30.1 | 18 | | | | |
| Preparative Example 2 | | | | 20 | 0.12 | 23.4 | 24 | | | | |
| Preparative Example 14 | | | | 21 | 0.17 | 33.2 | 22 | 20 | 0.15 | 29.9 | 22 |
| Preparative Example 15 | | | | 22 | 0.17 | 31.7 | 22 | | | | |
| Preparative Example 13 | | | | 23 | 0.17 | 29.9 | 12* | | | | |
| Preparative Example 11 | | | | 23 | 0.18 | 30.6 | 21 | 25 | 0.16 | 26.4 | 19 |
| Preparative Example 12 | | | | 28 | 0.22 | 32.2 | 19 | 22 | 0.20 | 36.6 | 20 |

The invention claimed is:

1. A cerium-zirconium based mixed oxide composition having:
   (a) a Ce:Zr molar ratio of 1 or less, and
   (b) a cerium oxide content of 10-50% by weight,
   wherein the cerium-zirconium based mixed oxide composition has
   (i) a surface area of at least 18 $m^2/g$, and a total pore volume as measured by $N_2$ physisorption of at least 0.11 $cm^3/g$, after aging at 1100° C. in an air atmosphere for 6 hours,
   (ii) a surface area of at least 42 $m^2/g$, and a total pore volume as measured by $N_2$ physisorption of at least 0.31 $cm^3/g$, after aging at 1000° C. in an air atmosphere for 4 hours, and
   (iii) a Dynamic Oxygen Storage Capacity (D-OSC) value as measured by $H_2$-TIR of greater than 500 μmol/g at 600° C. after aging at 800° C. in an air atmosphere for 2 hours.

2. The cerium-zirconium based mixed oxide composition as claimed in claim 1 further having a surface area of at least 33 $m^2/g$, and a total pore volume as measured by $N_2$ physisorption of at least 0.20 $cm^3/g$, after aging at 1050° C. in an air atmosphere for 2 hours.

3. The cerium-zirconium based mixed oxide composition as claimed in claim 1 further having a surface area of at least 48 $m^2/g$, and a total pore volume as measured by $N_2$ physisorption of at least 0.29 $cm^3/g$, after aging at 950° C. in an air atmosphere for 2 hours.

4. A The cerium-zirconium based mixed oxide composition as claimed in claim 1 further having a surface area of at least 18 $m^2/g$, and a total pore volume as measured by $N_2$ physisorption of at least 0.11 $cm^3/g$, after hydrothermal ageing at 1100° C. for 12 hours in an air atmosphere comprising 10% by volume of water.

5. A The cerium-zirconium based mixed oxide composition as claimed in claim 1, comprising wherein the one or more rare earth oxides other than cerium oxide which are present in an individual amount of 1-15% by weight, and wherein the one or more rare earth oxides other than cerium oxide are present in a total amount of 1-20% by weight.

6. The cerium-zirconium based mixed oxide composition as claimed in claim 1, wherein a total amount of cerium oxide and zirconium oxide is at least 80% by weight of the cerium-zirconium based mixed oxide composition.

7. A catalytic system comprising the cerium-zirconium based mixed oxide composition as claimed in claim 1.

8. A process for treating an exhaust gas from a vehicle engine comprising contacting the exhaust gas with the cerium-zirconium based mixed oxide composition as claimed in claim 1.

9. A process for preparing the cerium-zirconium based mixed oxide composition as claimed in claim 1, the process comprising the steps of:
   (a) dissolving a zirconium salt in an aqueous acid forming a resulting solution,
   (b) adding one or more complexing agents to the resulting solution of step (a) to form a solution or a sol, the one or more complexing agents being an organic compound comprising at least one of the following functional groups: an amine, an organosulphate, a sulphonate, a hydroxyl, an ether or a carboxylic acid group,
   (c) heating the solution or the sol,
   (d) adding a cerium salt, and adding a sulphating agent either before or after the addition of the cerium salt,
   (e) adding a base to form a cerium-zirconium based mixed hydroxide, and
   (h) calcining the cerium-zirconium based mixed hydroxide to form the cerium-zirconium based mixed oxide composition.

10. The process as claimed in claim 9, wherein the zirconium salt is zirconium basic carbonate or zirconium hydroxide.

11. The process as claimed in claim 9, wherein the aqueous acid is hydrochloric acid, sulphuric acid, nitric acid or acetic acid.

12. The process as claimed in claim 11, wherein the aqueous acid is nitric acid.

13. The process as claimed in claim 12, wherein in step (a), a molar ratio of zirconium ions to nitrate ions in the solution or sol is 1:0.8 to 1:1.5.

14. The process as claimed in claim 9, wherein the complexing agent is an alpha hydroxy carboxylic acid.

15. The process as claimed in claim 14, wherein the alpha hydroxy carboxylic acid is mandelic acid.

16. The process as claimed in claim 9, wherein in step (a) the resulting solution is heated to at least 40° C.

17. The process as claimed in claim 9, wherein in step (c) the solution or the sol is heated to a temperature of 80-100° C.

18. The process as claimed claim 9, wherein the sulphating agent is sulphuric acid.

19. The process as claimed in claim 18, wherein in step (d) the solution is allowed to cool, or cooled, to a temperature less than 40° C. before adding the sulphuric acid.

20. The process as claimed in claim 9, wherein step (d) additionally comprises adding an aqueous electrolyte.

21. The process as claimed in claim 20, wherein the aqueous electrolyte is fully or partially neutralised hydrochloric acid, nitric acid or acetic acid.

22. The process as claimed in claim 9, wherein step (d) additionally comprises adding one or more salts of: silica, aluminium, strontium, a transition metal or a rare earth element including yttrium.

23. The process as claimed in claim 9, wherein step (e) is carried out at a temperature of from −5° C. to 95° C.

24. The process as claimed in claim 9, wherein the cerium-zirconium based mixed hydroxide or the cerium-zirconium based mixed oxide composition comprises 10-50% by weight of cerium oxide and at least 20% by weight of zirconium oxide.

25. A cerium-zirconium based mixed oxide composition having:
   (a) a Ce:Zr molar ratio of 1 or less, and
   (b) a cerium oxide content of 10-50% by weight,
wherein the cerium-zirconium based mixed oxide composition has
   (i) a surface area of at least 18 $m^2/g$, and a total pore volume as measured by $N_2$ physisorption of at least 0.11 $cm^3/g$, after aging at 1100° C. in an air atmosphere for 6 hours,
   (ii) a surface area of at least 42 $m^2/g$, and a total pore volume as measured by $N_2$ physisorption of at least 0.31 $cm^3/g$, after aging at 1000° C. in an air atmosphere for 4 hours,
   (iii) a Dynamic Oxygen Storage Capacity (D-OSC) value as measured by $H_2$-TIR of greater than 500 μmol/g at 600° C. after aging at 800° C. in an air atmosphere for 2 hours, and
   (iv) a crystallite size as measured by applying the Scherrer equation to the relevant peak in its XRD scan of no greater than 12 nm after aging at 950° C. in an air atmosphere for 2 hours.

26. A The cerium-zirconium based mixed oxide composition as claimed in claim 25, wherein the cerium-zirconium based mixed oxide composition has the crystallite size as measured by applying the Scherrer equation to the relevant peak in its XRD scan of no greater than 10 nm after aging at 950° C. in an air atmosphere for 2 hours.

27. The cerium-zirconium based mixed oxide composition as claimed in claim 25, comprising wherein the one or more rare earth oxides other than cerium oxide which are present in an individual amount of 1-15% by weight, and wherein the one or more rare earth oxides other than cerium oxide are present in a total amount of 1-20% by weight.

* * * * *

UNITED STATES PATENT AND TRADEMARK OFFICE
CERTIFICATE OF CORRECTION

PATENT NO. : 11,613,473 B2
APPLICATION NO. : 15/770065
DATED : March 28, 2023
INVENTOR(S) : Deborah Jayne Harris and David Alastair Scapens It is certified that error appears in the above-identified patent and that said Letters Patent is hereby corrected as shown below:

On the Title Page

Item (57) In the abstract, Line 1, please change "have" to "having"

In the Claims

In Column 20, Line 45, (Claim 4), please delete "A" prior to "The cerium-zirconium based"

In Column 20, Line 51, (Claim 5), please delete "A" prior to "The cerium-zirconium based"

In Column 20, Line 52, (Claim 5), please delete "wherein the" after "comprising"

In Column 21, Line 17, (Claim 9), please change "(h)" to "(f)"

In Column 21, Line 43, (Claim 19), please change "the solution" to "the solution or the sol"

In Column 22, Line 34, (Claim 26), please delete "A" prior to "The cerium-zirconium-based"

In Column 22, Line 41, (Claim 27), please delete "wherein the" after "comprising"

Signed and Sealed this
Fourth Day of July, 2023

Katherine Kelly Vidal
*Director of the United States Patent and Trademark Office*